United States Patent
Takaki et al.

(10) Patent No.: US 6,903,870 B2
(45) Date of Patent: Jun. 7, 2005

(54) TELESCOPIC APPARATUS

(75) Inventors: Junji Takaki, Tokyo (JP); Noboru Kawaguchi, Tokyo (JP); Yoshihiro Hasuyama, Tokyo (JP); Masaki Tabata, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/920,269

(22) Filed: Aug. 18, 2004

(65) Prior Publication Data

US 2005/0052736 A1 Mar. 10, 2005

(30) Foreign Application Priority Data

Aug. 25, 2003 (JP) ....................................... 2003-299789

(51) Int. Cl.⁷ .............................................. G02B 23/00
(52) U.S. Cl. ...................... 359/399; 359/849; 359/871; 343/878
(58) Field of Search ................................ 359/430, 849, 359/399, 224, 429, 298; 343/878, 882, 883, 703

(56) References Cited

U.S. PATENT DOCUMENTS 3,153,789 A * 10/1964 Ashton ........................ 343/765
4,566,432 A * 1/1986 Sobczak et al. ............. 126/606
5,125,206 A * 6/1992 Motohashi et al. ............ 52/646
2003/0197655 A1 * 10/2003 Honma ......................... 343/757

FOREIGN PATENT DOCUMENTS

| JP | 3-3402 | 1/1991 |
| JP | 6-117854 | 4/1994 |

OTHER PUBLICATIONS

D. Woody, D. Vail, W. Schaal, "Design, Construction, and Performance of Leighton 10.4–m–Diameter Radio Telescopes," May 1994, Proc. IEEE, vol. 82, No. 5, pp. 673–686.*

David P. Woody, et al., "A Design for a Precision 10–m Sub–Millimeter Antenna", MMA MEMO 241, Mar. 10, 1999, 14 Pages.

* cited by examiner

Primary Examiner—Drew A. Dunn
Assistant Examiner—Mark Consilvio
(74) Attorney, Agent, or Firm—Oblon, Spivak, McClelland, Maier & Neustadt, P.C.

(57) ABSTRACT

A link-mechanism base is prepared within a yoke portion, and a link member is prepared in connection with the base within left and right supports. The link member connects the upper part of the supports or the upper part of the yoke portion, and the link-mechanism base. The displacement and angle of rotation of the upper part of the yoke portion are measured by using these link-mechanism base and link member, thereby measuring a change in the pointing direction of a reflector.

6 Claims, 8 Drawing Sheets

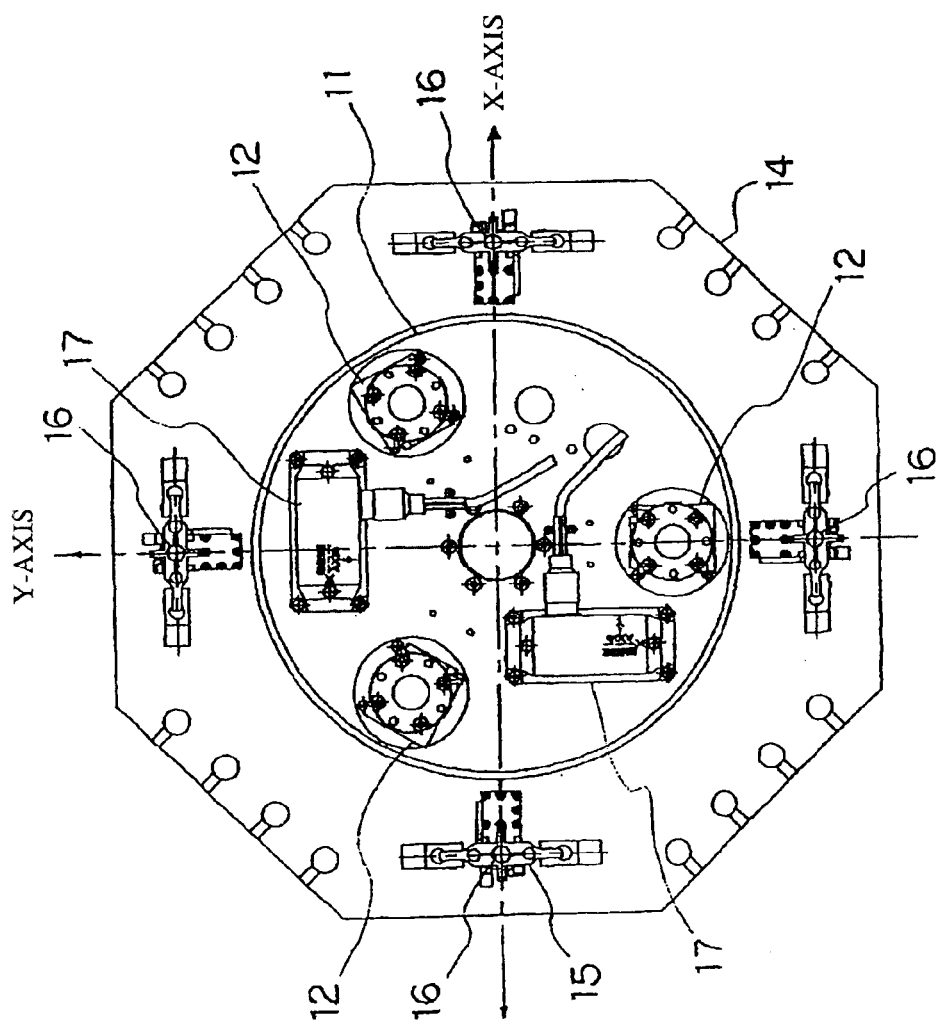

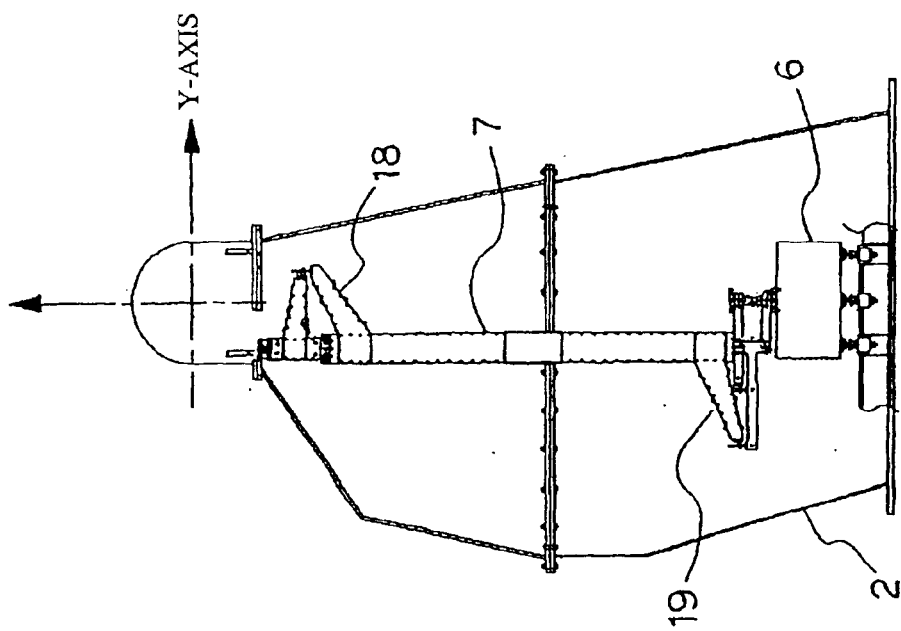
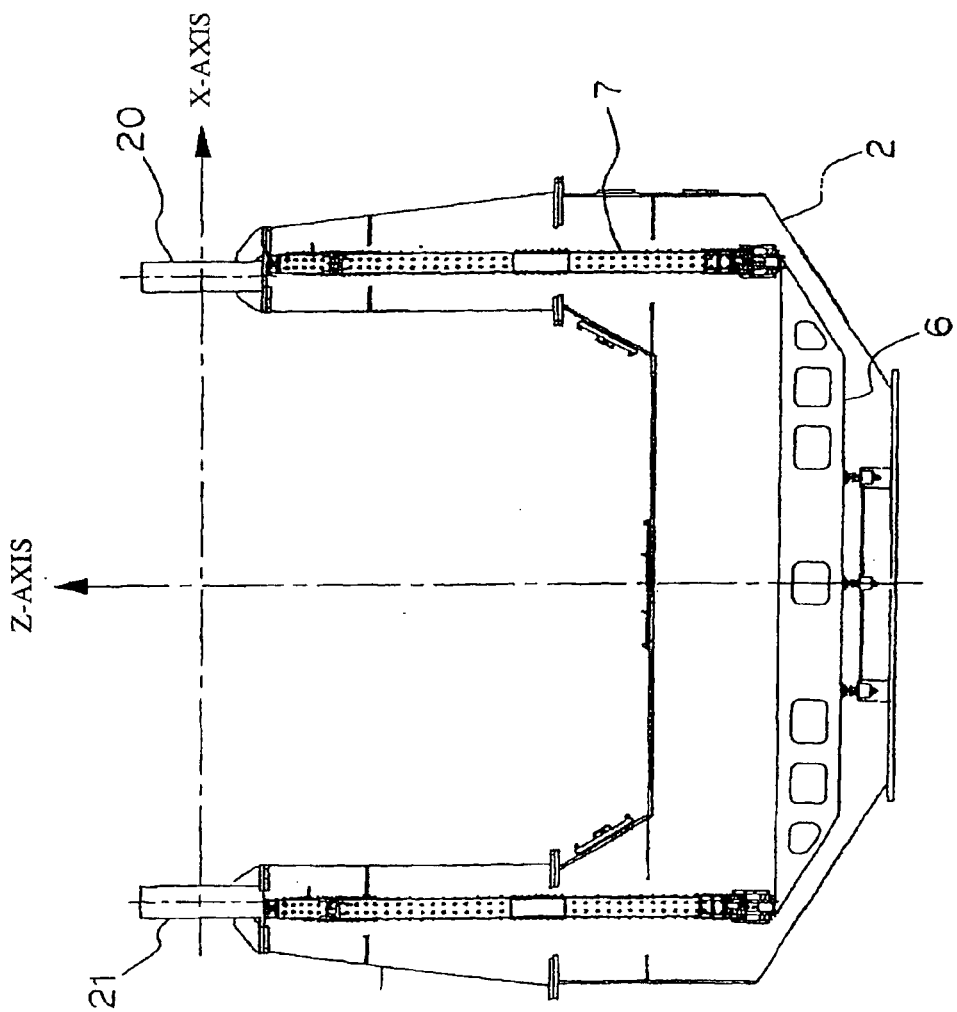

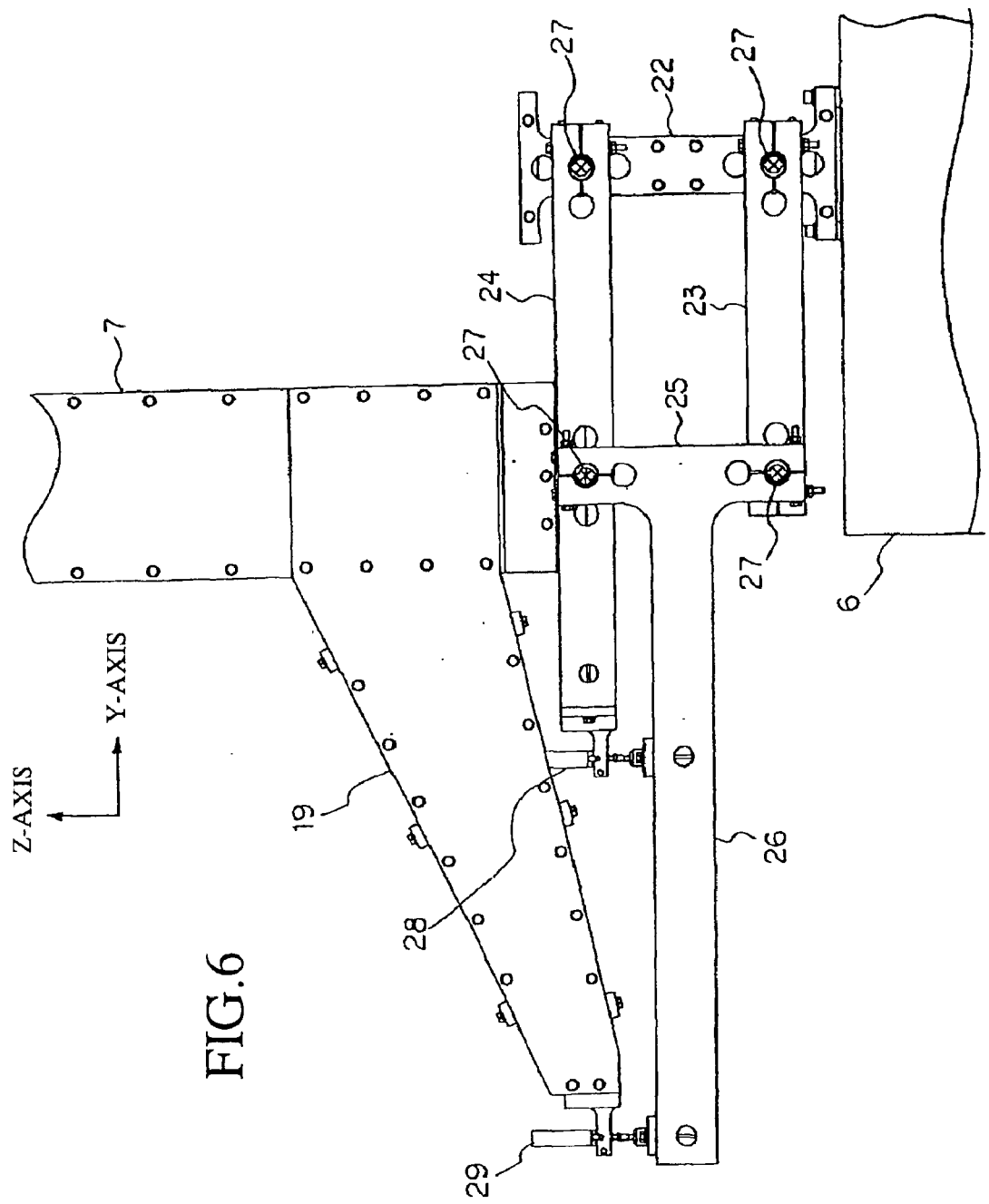

TELESCOPIC APPARATUS

BACKGROUND OF THE INVENTION

1. Field of the Invention

The present invention relates to a telescopic apparatus capable of measuring the displacement or inclination of its supporting structure which may affect its pointing direction in order to correct the direction.

2. Description of the Related Art

In the field of radio astronomy, in recent years, there have been strong demands towards observing higher-frequency waves from extremely high frequency waves to submillimeter waves. When observing radio objects of a high frequency, higher accuracy is demanded of the reflector surface of a telescope and of the beam-pointing or tracking thereof. Meanwhile, in order to improve the efficiency of observation, the widening of the diameter of the telescope advances, and it is desired that the observation can be performed under any weather conditions at any time of night and day. Because of the widened diameter of the telescope, the deformation thereof caused by its weight becomes large, and moreover, the thermal deformation caused by solar radiation and the deformation caused by wind pressure also become large. As a result, it becomes difficult to obtain high pointing and tracking accuracy thereof. In order to meet the demand for such high pointing and tracking accuracy, the technology that measures the pointing error of the reflector of the telescope, and corrects the error in real time is required. The factors that cause the pointing error of the telescope include the deformation of the structural part supporting the primary reflector. As a method of measuring this deformation, an optical measuring method using laser and a photodetector for detecting the laser and a measuring method using a mechanical technique are conceived. However, for the former method, a large measurement error may be caused by fluctuations in the atmosphere in the optical system, and further, high-speed measurement may be difficult because of delays in processing the photo-detected image. On the other hand, JP-A-6-117854 discloses, as the measuring method using the mechanical technique, a method of measuring the angle of inclination of or the difference of altitude of the structure.

The apparatus disclosed by JP-A-6-117854 measures the angle of inclination of or the difference of altitude of the structure by measuring the deformation of one parallel link mechanism. However, this apparatus cannot measure the horizontal displacement and vertical displacement of the structure to be measured. For this reason, there is a problem that this mechanical technique is not suitable for a method of measuring the deformation of the reflector-supporting structure to correct the pointing error of the telescope.

SUMMARY OF THE INVENTION

The present invention has been accomplished to solve the above-mentioned problem, and an object of the present invention is to provide a telescopic apparatus that has a measuring system that can precisely measure the deformation of its supporting structure, and further can follow the swing generated in a high frequency wave.

A telescopic apparatus according to the present invention comprises: a reflector; a yoke portion that supports this reflector by using two supports, and rotates around an azimuth axis; a base that supports this yoke portion; a link-mechanism base supported on the bottom within the yoke portion; a parallel link mechanism provided within this link-mechanism base; a link member that is provided within the support of the yoke portion, and is connected with the upper part of the yoke portion and with the parallel link mechanism; a first arm secured on the upper part of this link member; a first length-measuring device that measures the displacement between the end of a member extending from the upper part of the yoke portion and the end of the first arm; a second arm secured on the lower part of the link member; and a second length-measuring device that measures the displacement between a member horizontally extending from the parallel link mechanism and the second arm.

According to the present invention, when the displacement of the link mechanism provided in the yoke portion of the telescopic apparatus is measured by using length-measuring devices, the displacement and inclination of the upper portion of the yoke portion can be measured and calculated. In such a way, there is no influence exerted by fluctuations in the atmosphere with performed precise measurement. Moreover, because the measurement can be carried out at relatively high speed, the swing generated in a high frequency wave can be measured.

BRIEF DESCRIPTION OF THE DRAWINGS

FIG. 4 is a configuration diagram of the telescopic apparatus taken along the plane of line A—A of FIG. 3;

FIG. 5A and FIG. 5B are configuration diagrams of the yoke portion of the telescopic apparatus in accordance with the first embodiment of the present invention;

FIG. 6 is an enlarged configuration diagram of the lower part of a link member 7 of the telescopic apparatus in accordance with the first embodiment of the present invention;

DETAILED DESCRIPTION OF THE PREFERRED EMBODIMENTS

An embodiment of the present invention will be described below.

First Embodiment

Figure 1:
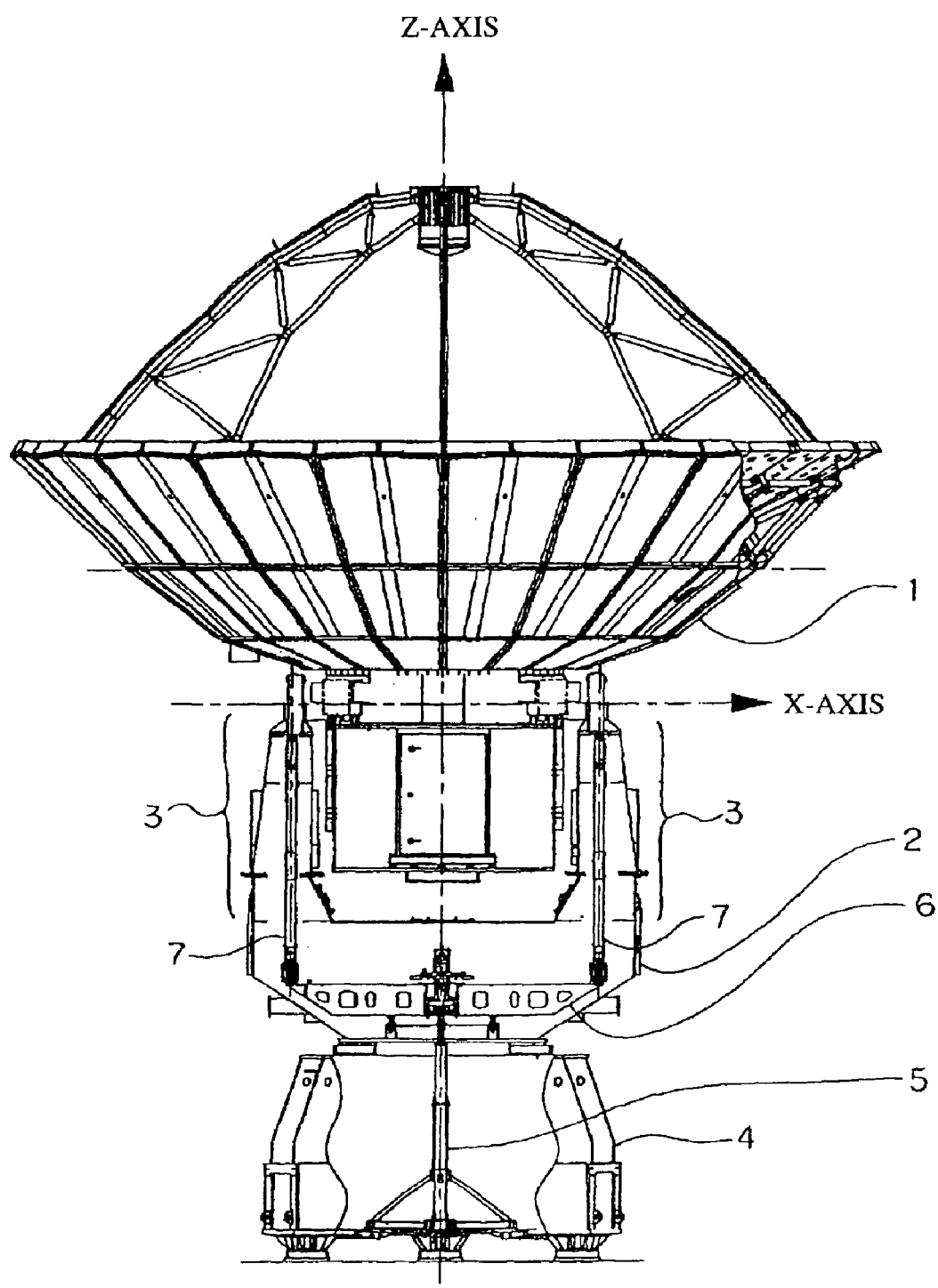
FIG. 1 is a configuration diagram of the whole telescopic apparatus in accordance with a first embodiment of the present invention.

A telescopic apparatus according to a first embodiment of the present invention will now be described by reference to FIG. 1 to FIG. 8. FIG. 1 is a configuration diagram of the entire telescopic apparatus. In FIG. 1, the reference numeral 1 is a reflector, and the numeral 2 is a yoke portion that supports the reflector 1 rotatably around the X-axis (see FIG. 1, also referred to as "elevation axis" hereinbelow). The yoke portion 2 rotatably supports the reflector 1 on the upper parts of right and left supports 3. The numeral 4 is a frame, and the frame 4 supports the yoke portion 2 rotatably around the Z-axis (as depicted). These basic mechanisms enable the reflector 1 to rotate around the Z-axis (azimuth axis) and around the X-axis (elevation axis) with changing the pointing direction for observation. In FIG. 1, the direction of the Y-axis is equal to the direction in which the Y-axis crosses the X-axis and the Z-axis at right angles (the direction perpendicular to space). In the frame 4, the numeral 5 is a central pole substantially vertically provided in the lower part of the frame 4. In the yoke portion 2, the numeral 6 is a link-mechanism base substantially horizontally provided on the basis of the central pole 5, and the numeral 7 is a link member provided within each of the right and left supports 3. The link member 7 connects the upper part of the support 3 (the upper part of the yoke portion 2) and the link-mechanism base 6. When the displacement and the angle of rotation of the upper part of the yoke portion 2 are measured by using these central pole 5, link-mechanism base 6, and link members 7, a change in the pointing direction of the reflector 1 can be measured.

Figure 2:
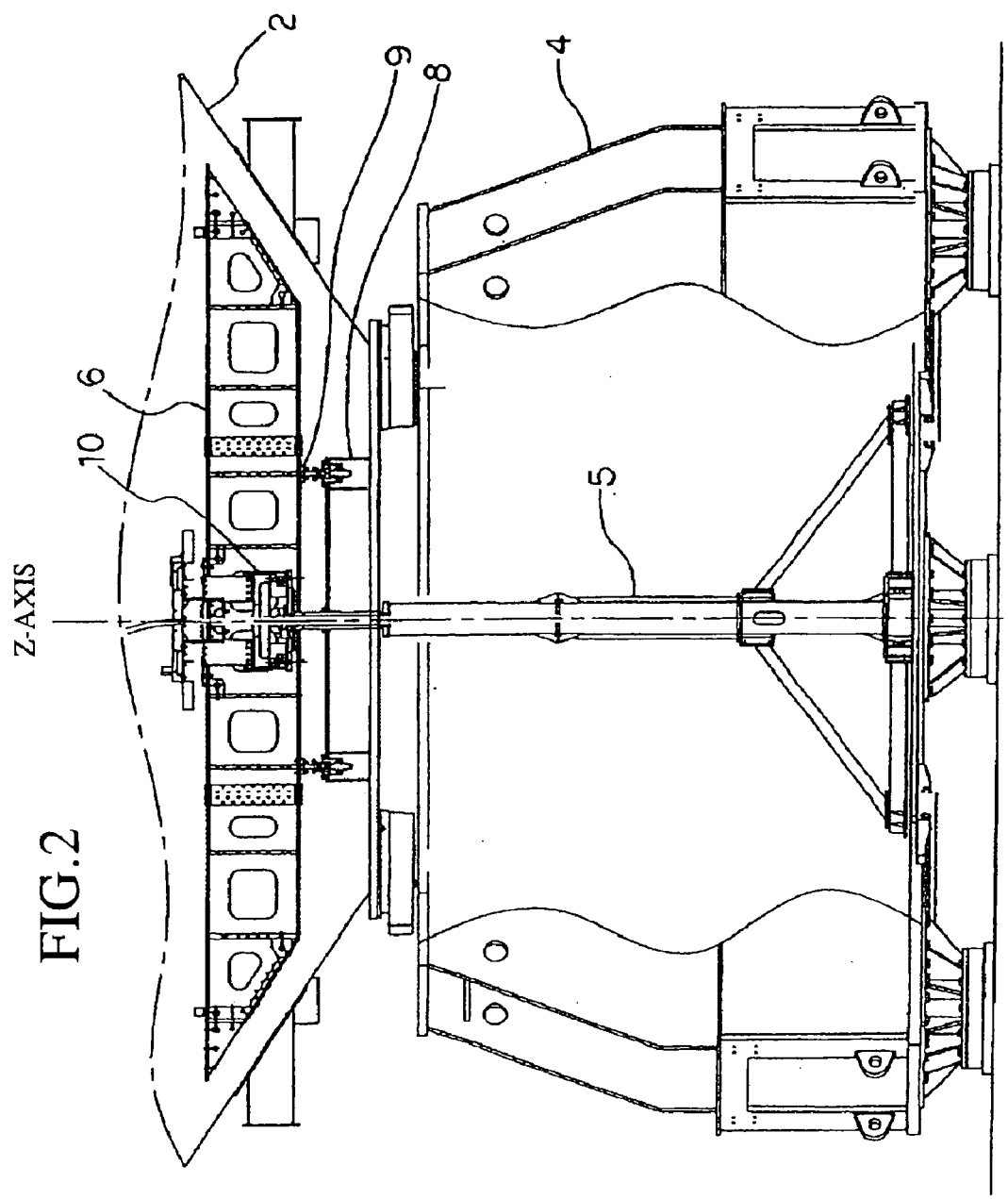
FIG. 2 is a configuration diagram from a frame 4 to the lower part of a yoke portion 2 of the telescopic apparatus in accordance with the first embodiment of the present invention.

The relationship between the central pole 5 and the link-mechanism base 6 will now be described by reference to FIG. 2. FIG. 2 is a configuration diagram from the frame 4 to the lower part of the yoke portion 2. Referring to FIG. 2, the numeral 8 is a base mount provided in the lower part of the yoke portion 2, and the numeral 9 is a fixture provided in the link-mechanism base 6. The link-mechanism base 6 is secured on the base mounts 8 by attaching the fixtures 9 on the base mounts through a bearing. Rigidly connecting or pin-connecting the above attaching points may be proposed; however, holding the attaching point in a state where the point has freedom of rotation by using pin connection is preferable because of difficult transmittance of thermal deformation and the like of the yoke portion 2 to the link-mechanism base 6. Here, the central pole 5 is secured to the frame 4, and the frame 4 itself is fixed on the ground. Therefore, the central pole 5 will be put in a fixed state. Meanwhile, the link-mechanism base 6 rotates together with the yoke portion 2 around the azimuth axis with respect to the frame 4. Moreover, referring to FIG. 2, the numeral 10 is a mirror provided on the upper part of the central pole 5. The inclination of the link-mechanism base 6 is measured by using this mirror 10.

Figure 3:
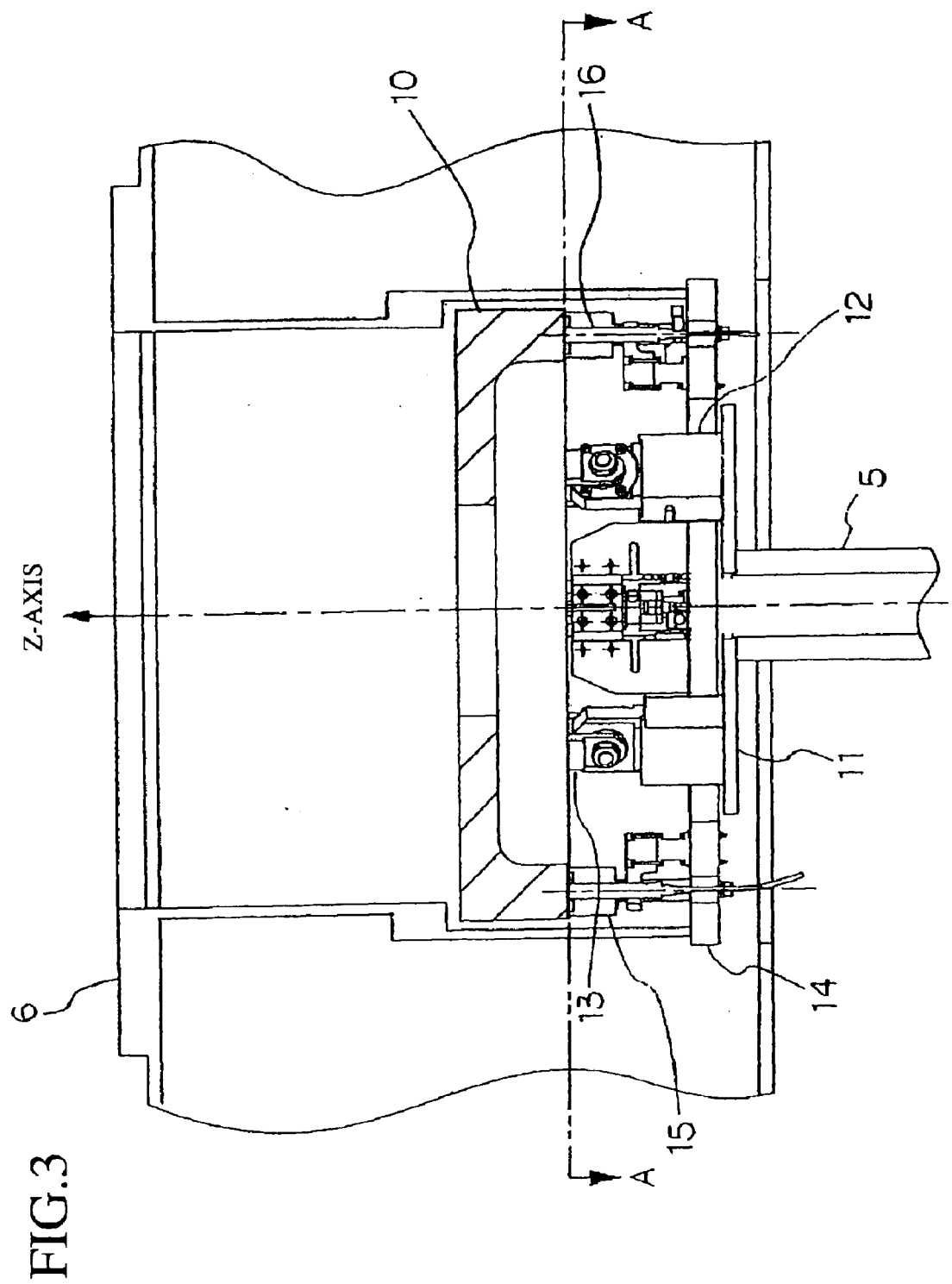
FIG. 3 is an enlarged configuration diagram in the vicinity of the upper part of a central pole 5 of the telescopic apparatus in accordance with the first embodiment of the present invention.

The measurement of the inclination of the link-mechanism base 6 using the mirror 10 will now be explained by reference to FIG. 3 and FIG. 4. FIG. 3 is an enlarged configuration diagram in the vicinity of the upper part of the central pole 5. In FIG. 3, the numeral 11 is a flange provided on the top of the central pole 5, the numeral 12 is a mirror mount, on which the mirror 10 is mounted, provided on the flange 11, and the numeral 13 is a fixture provided on the mirror 10 to be fixed on the mirror mount 12. The numeral 14 is a measuring stand provided in the link-mechanism base, the numeral 15 is a sensor holder that is provided on the measuring stand 14, and is used for holding a gap sensor, and the numeral 16 is a gap sensor held within this sensor holder. There is a small gap between the sensor holder 15 and the mirror 10. The gap sensor 16 measures the distance between the sensor head and the mirror 10.

FIG. 4 is a configuration diagram of the apparatus taken along the plane of line A—A of FIG. 3. As shown in FIG. 4, three mirror mounts 12 are provided on the flange 11, and the mirror 10 is secured on these three mounts. The mirror 10 may be mounted with rigid coupling to these mounts; however, preferably, in order to suppress the deformation of the mirror 10, the mirror mount 12 and the fixture 13 are connected through a bearing or the like, to thereby pin the mirror to the mounts. Further, two tiltmeters 17 are arranged on the flange 11 to measure the tilt angles, on the flange 11, around the X-axis and around the Y-axis to determine these measurements as the tilt angles of the mirror 10. However, the tiltmeters 17 may be also arranged on the mirror 10 to directly measure the tilt angles of the mirror 10.

Meanwhile, four gap sensors 16 are disposed on the measuring stand 14, to thereby measure the distances between the heads of the sensors and the mirror 10. Each of the gap sensors 16 is held by a sensor holder 15, and the sensor rotates, together with the link-mechanism base 6 (and the yoke portion 2) around the azimuth axis (Z-axis). The mirror 10 is fixed on the central pole 5, and thereby the mirror does not rotate around the azimuth axis. The bottom surface of the mirror 10 (the bottom surface that seems to have a doughnut shape as seen from the minus side of the Z-axis) is mirror-finished, and at an arbitrary azimuth angle, after the yoke portion 2 is driven, the distances between the four gap sensors 16 and the bottom surface of the mirror 10 can be measured. The inclination of the link-mechanism base 6 around the Y-axis can be measured by using the output of the two gap sensors 16 disposed on the X-axis, and the inclination of the link-mechanism base 6 around the X-axis can be measured by using the output of the two gap sensors 16 disposed on the Y-axis. The inclination of the link-mechanism base 6 around each of the axes, which is measured by each of the gap sensors 16, is the inclination thereof measured with respect to the mirror 10. Therefore, the obtained inclinations are corrected by using the inclination of the mirror 10 measured by use of the tiltmeter 17.

The measurement system that measures the displacement and inclination of the upper part of the yoke portion 2 by using the link mechanism placed on the link-mechanism base 6 will now be explained by using FIG. 5A to FIG. 8B. Referring to FIG. 5A and FIG. 5B, the numeral 18 is an arm that extends from the upper part of the link member 7 in a direction of the Y-axis, and the numeral 19 is an arm that extends from the lower part of the link member in a direction of the Y-axis. These components are provided on the right and left sides of the yoke portion 2 as shown in FIG. 5A. Further, the numerals 20 and 21 are right and left housings, respectively, provided on the upper part of the yoke portion 2, and these housings 20 and 21 hold the reflector 1. The displacements, in a direction of the Z-axis, of the ends and the substantially intermediate positions of the arms 18 and 19 are measured by using length-determining devices, and from the geometric calculations based on the measurement results, the displacement and rotation angle (around the X-axis) of the upper part of the yoke portion 2 are calculated.

FIG. 6 is an enlarged configuration diagram of the lower part of the link member 7. In FIG. 6, the numeral 22 is a vertical member that is fixedly and substantially vertically provided on the link-mechanism base, the numeral 23 is a horizontal member that is connected with the lower part of the vertical member 22, and is substantially horizontally provided thereon, the numeral 24 is a horizontal member that is connected with the upper part of the vertical member 22, and is provided parallel to the horizontal member 23, and the numeral 25 is a vertical member that is provided such that both of its ends are connected with the ends of the horizontal member 23 and the horizontal member 24, and the vertical member itself is arranged parallel to the vertical member 22. The vertical member 25 has an arm 26 that horizontally extends therefrom, and further the horizontal member 24 extends from the vertical member 22 crossing over the vertical member 25. The numerals 27 are bearings that each connect the vertical member 22, vertical member 25, horizontal member 23, and horizontal member 24 in their connections. The bearings 27 are arranged at four places as shown in FIG. 6. For the bearing 27, a rolling bearing such as a ball bearing may be used; however, because a rolling bearing makes a movement such as radial run-out, and thereby the measurement accuracy is deteriorated, an elastic pivot bearing using a blade spring is preferably used. The vertical member 22, vertical member 25, horizontal member 23, and horizontal member 24 constitute a parallel link mechanism. The numeral 28 is a length-determining device that is provided at the end of the horizontal member, and measures the perpendicular displacement (the relative displacement in a vertical direction) between the end of the horizontal member 24 and the arm 26 of the vertical member 25. The numeral 29 is a length-determining device that is provided at the end of the arm 19, and measures the perpendicular displacement (the relative displacement in a vertical direction) between the end of the arm 19 and the end of the arm 26 of the vertical member 25. That is, the length-determining device 28 is provided for measuring the inclinations of the horizontal member 23 and horizontal member 24 in a case where the above-mentioned parallel link mechanism is deformed. The length-determining device 29 measures the displacement between the arm 19 and the arm 26 horizontally extending from the above-mentioned parallel link mechanism. The link member 7 is substantially vertically connected to the top of the horizontal member 24 with a bearing, preferably an elastic pivot bearing.

Figure 7:
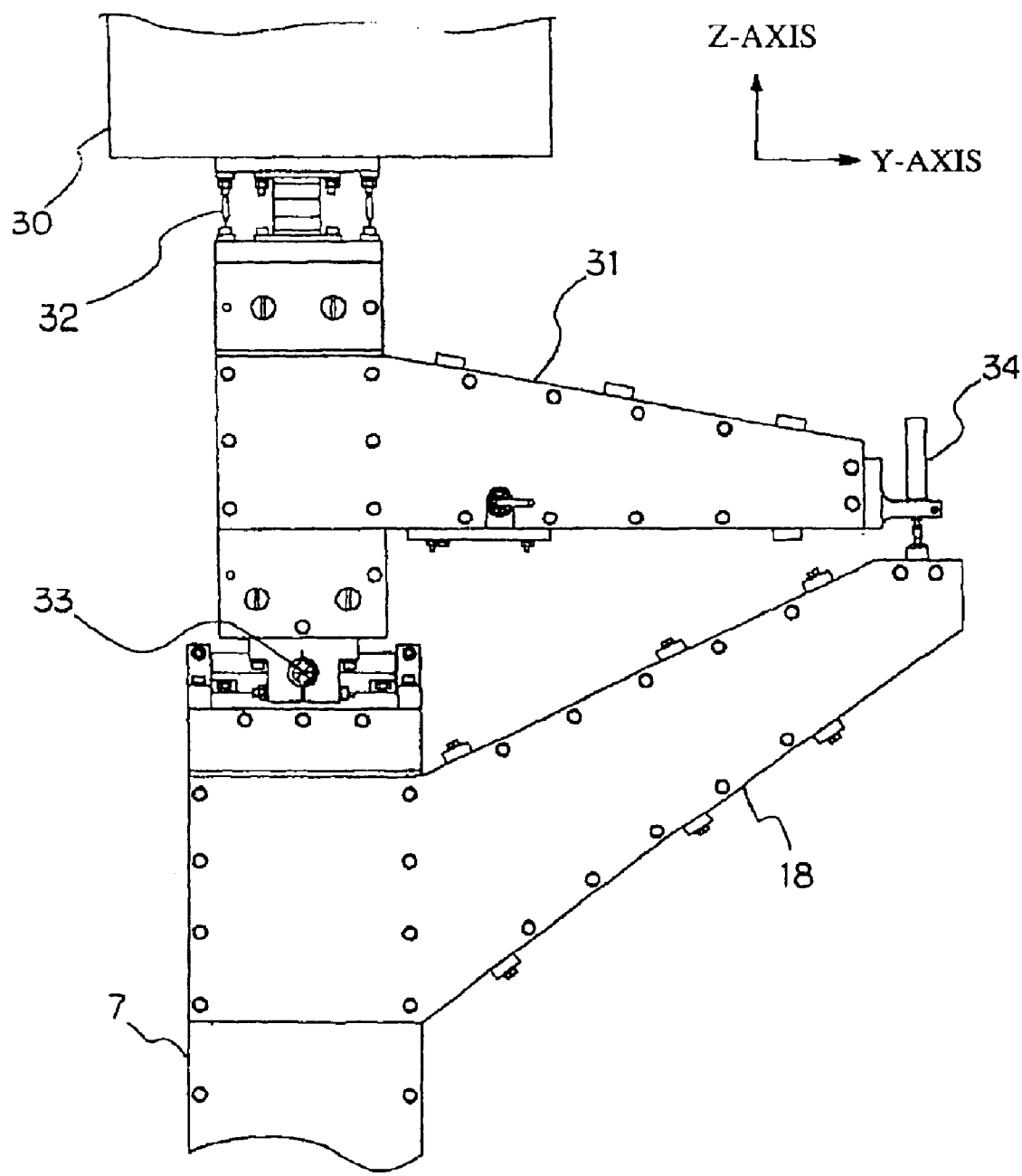
FIG. 7 is an enlarged configuration diagram of the upper part of the link member 7 of the telescopic apparatus in accordance with the first embodiment of the present invention.

FIG. 7 is an enlarged configuration diagram of the upper part of the link member 7. Referring to FIG. 7, the numeral 30 is an upper structural member of the yoke portion 2, the numeral 31 is an arm that extends from the upper part of the yoke portion 2 in a direction of the Y-axis, and the numerals 32 are four blade springs provided between the arm 31 and the structural member 30. The blade spring 32 is disposed, such that its longitudinal direction is arranged in a direction of the Z-axis, at the center of each of the sides of a square in the XY plane. Such a structure gives a configuration in which a twist deformation load around the Z-axis is not easily transmitted between the structural member 30 and the arm 31. The numeral 33 is a bearing used in the connection between the arm 31 and the link member 7. For the bearing 33, a rolling bearing such as a ball bearing may be used; however, because a rolling bearing make a movement such as radial run-out, and thereby the measurement accuracy is deteriorated, an elastic pivot bearing using a blade spring is preferably used. The numeral 34 is a length-determining device that is provided at the end of the arm 31, and measures the vertical displacement (the relative displacement in a vertical direction) between the end of the arm 31 and the end of the arm 18.

Figure 8B:
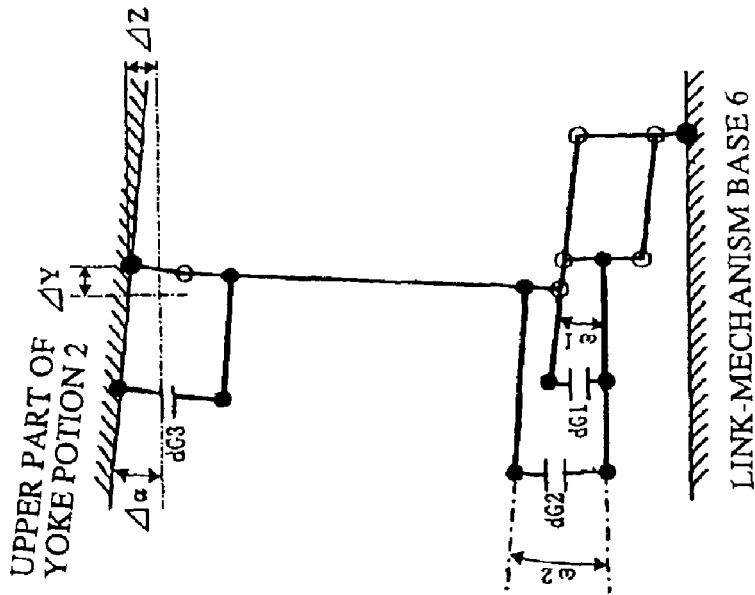
FIG. 8A and FIG. 8B are schematic diagrams for explaining the principle of measurement of the displacement and inclination of the upper part of the yoke portion 2 of the telescopic apparatus in accordance with the first embodiment of the present invention.
Figure 8A:
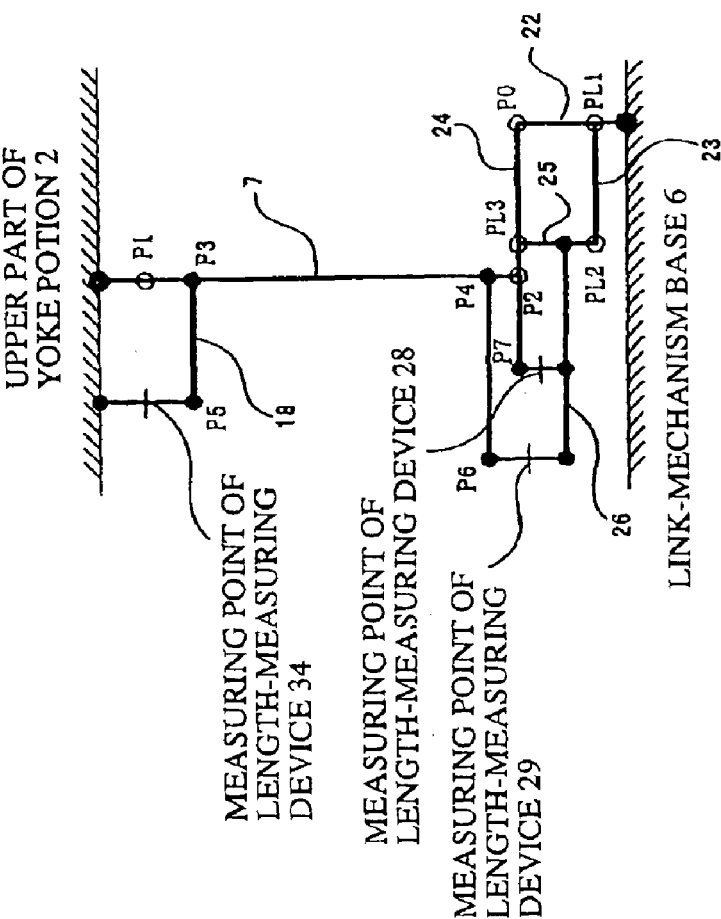

The principle that the displacement of each of the places is measured by use of the length-determining devices 28 and 29 explained by reference to FIG. 6 and the length-determining device 34 explained by reference to FIG. 7, and the displacement and inclination of the upper part of the yoke portion 2 are thereby calculated will now be explained as below. FIG. 8A and FIG. 8B are schematic diagrams for explaining the principle of measurement of the displacement and inclination of the upper part of the yoke portion 2. FIG. 8A shows the state in which there are no displacement and inclination thereof, and FIG. 8B shows the state in which the displacement and inclination are caused. Moreover, the figure of each part of the link mechanism illustrated in FIG. 8B shows the state in which the displacement and inclination are relatively caused with respect to the link-mechanism base 6 in the upper part of the yoke portion 2. That is, the link-mechanism base 6 is fixed, and with respect to this link-mechanism base 6, the upper part of the yoke portion is displaced by $\Delta Y$ and $\Delta Z$, and rotated by $\Delta \alpha$. It is assumed that at that time the P0–P7 part is inclined by $\omega 1$ with respect to the PL1–PL2 part, and the P4–P6 part is inclined by $\omega 2$ with respect to the P3–P5 part. Furthermore, when the displacements measured by the length-determining devices 28, 29, and 34 are set to dG1, dG2, and dG3, respectively, the inclinations $\omega 1$ and $\omega 2$ can be geometrically calculated from the measured dG1 and dG2 in the lower part of the link member 7. The position of P3 can be thereby calculated, and additionally, $\Delta Y$, $\Delta Z$, and $\Delta \alpha$ can be calculated by geometric calculation based on dG3. When expressing it mathematically, the following formula is obtained, $$\Delta Y = f1(dG1, dG2, dG3)$$

$$\Delta Z = f1(dG1, dG2, dG3)$$

$$\Delta \alpha = f1(dG1, dG2, dG3)$$

where f1, f2 and f3 each are a function determined geometrically.

The method of calculating the error of the pointing direction of the telescope in the structure described above will now be explained as below. First of all, the change of the absolute inclination amount $\Delta \alpha b$ of the link-mechanism base 6 is the sum of the change of the inclination amount $\Delta \alpha c$ of the central pole 5 (measured by the tiltmeter 17) and the change of the inclination amount $\Delta \alpha g$ of the link-mechanism base 6 with respect to the central pole 5 (measured by the gap sensor 16). That is, $\Delta \alpha b = \Delta \alpha c + \Delta \alpha g$. By using the inclination amounts of the left and right upper parts of the yoke portion 2: $\Delta \alpha L$ and $\Delta \alpha R$, and the displacements thereof: $\Delta YL$, $\Delta YR$, $\Delta ZL$, and $\Delta ZR$, which are measured and calculated by using the left and right link members 7 of the yoke portion 2, the inclinations of the axes of elevation angle around each of the axes $\alpha EL$, $\beta EL$, and $\gamma EL$ can be calculated as follows;

$$\alpha EL = (\Delta \alpha L + \Delta \alpha R)/2 + \Delta \alpha b$$

$$\beta EL = \tan^{-1}\{(\Delta ZR - \Delta ZL)/D\}$$

$$\gamma EL = \tan^{-1}\{(\Delta YR - \Delta YL)/D\}$$

where D is a distance between the left and right upper parts of the yoke portion 2.

Further, for the materials of the link-mechanism base 6 and the link member 7, low-thermal-expansion materials, for example, CFRP (carbon fiber reinforced plastic) materials are preferably used. In the structure of the yoke portion, metallic materials such as steel materials are usually used. Therefore, in the measuring system composed of the link-mechanism base 6 and the link member 7, the material having a coefficient of thermal expansion an order of magnitude lower than that of the structural material of the yoke portion is preferably used. Further, for the similar reason, for the materials of the arms 18 and 19, the vertical members 22 and 25, and the horizontal members 23 and 24, which are used in the parallel link mechanism, low thermal expansion materials, for example, CFRP (carbon fiber reinforced plastic) materials are also preferably used.

What is claimed is:

1. A telescopic apparatus comprising:
    a reflector;
    a yoke portion that supports this reflector by using two supports, and rotates around an azimuth axis;
    a base that supports this yoke portion;
    a link-mechanism base supported on the bottom within the yoke portion;
    a parallel link mechanism provided within this link-mechanism base;
    a link member that is provided within the support of the yoke portion, and is connected with the upper part of the yoke portion and with the parallel link mechanism;
    a first arm secured on the upper part of this link member;
    a first length-measuring device that measures the displacement between the end of a member extending from the upper part of the yoke portion and the end of the first arm;
    a second arm secured on the lower part of the link member; and
    a second length-measuring device that measures the displacement between a member horizontally extending from the parallel link mechanism and the second arm.

2. A telescopic apparatus according to claim 1, wherein the parallel link mechanism includes a third length-measuring device for measuring the inclination of the parallel link mechanism.

3. A telescopic apparatus according to claim 1, wherein the connecting portion of the link member includes an elastic pivot bearing.

4. A telescopic apparatus according to claim 1, further comprising:
    a central pole that is provided on a frame supporting the yoke portion;
    a mirror provided on this central pole; and
    a gap sensor used for measuring the displacement between this mirror and the link-mechanism base.

5. A telescopic apparatus according to claim 4, wherein the central pole includes a tiltmeter that measures the inclination of the central pole.

6. A telescopic apparatus according to claim 1, wherein the materials of the link-mechanism base and of the link member include CFRP material.

* * * * *